US 6,668,123 B1

(12) United States Patent
Ellison et al.

(10) Patent No.: US 6,668,123 B1
(45) Date of Patent: Dec. 23, 2003

(54) FIBER TROUGH JUNCTION COVER SYSTEM

(75) Inventors: Steven W. Ellison, Mead, WA (US); Stephen R. Glaser, Post Falls, ID (US)

(73) Assignee: Telect, Inc., Liberty Lake, WA (US)

( * ) Notice: Subject to any disclaimer, the term of this patent is extended or adjusted under 35 U.S.C. 154(b) by 0 days.

(21) Appl. No.: 09/649,823

(22) Filed: Aug. 28, 2000

(51) Int. Cl.[7] ................................................. G02B 6/00
(52) U.S. Cl. ....................................................... 385/134
(58) Field of Search ................................. 385/134, 135

(56) References Cited

U.S. PATENT DOCUMENTS

| | | | |
|---|---|---|---|
| 3,003,794 A | * 10/1961 | Burley | 285/179.1 |
| 4,891,471 A | * 1/1990 | Ono et al. | 174/68.3 |
| 5,039,828 A | * 8/1991 | Marks et al. | 174/72 A |
| 5,316,243 A | 5/1994 | Henneberger | 248/68.1 |
| 5,752,781 A | 5/1998 | Haataja et al. | 403/387 |
| 5,753,855 A | * 5/1998 | Nicoli et al. | 174/72 R |
| 5,792,993 A | * 8/1998 | Rinderer | 174/101 |
| 6,192,181 B1 | * 2/2001 | Haataja et al. | 385/136 |

* cited by examiner

Primary Examiner—Lynn Feild
Assistant Examiner—Brian S. Webb
(74) Attorney, Agent, or Firm—Wells St. John P.S.

(57) ABSTRACT

Disclosed is a fiber optic cable trough junction cover system for providing a cover which protects, but provides better access to the interior of trough junctions. More particularly, embodiments of this invention provide a dual hinge arrangement to allow access without being required to either rotate the full one piece junction cover upward or remove it completely.

3 Claims, 11 Drawing Sheets

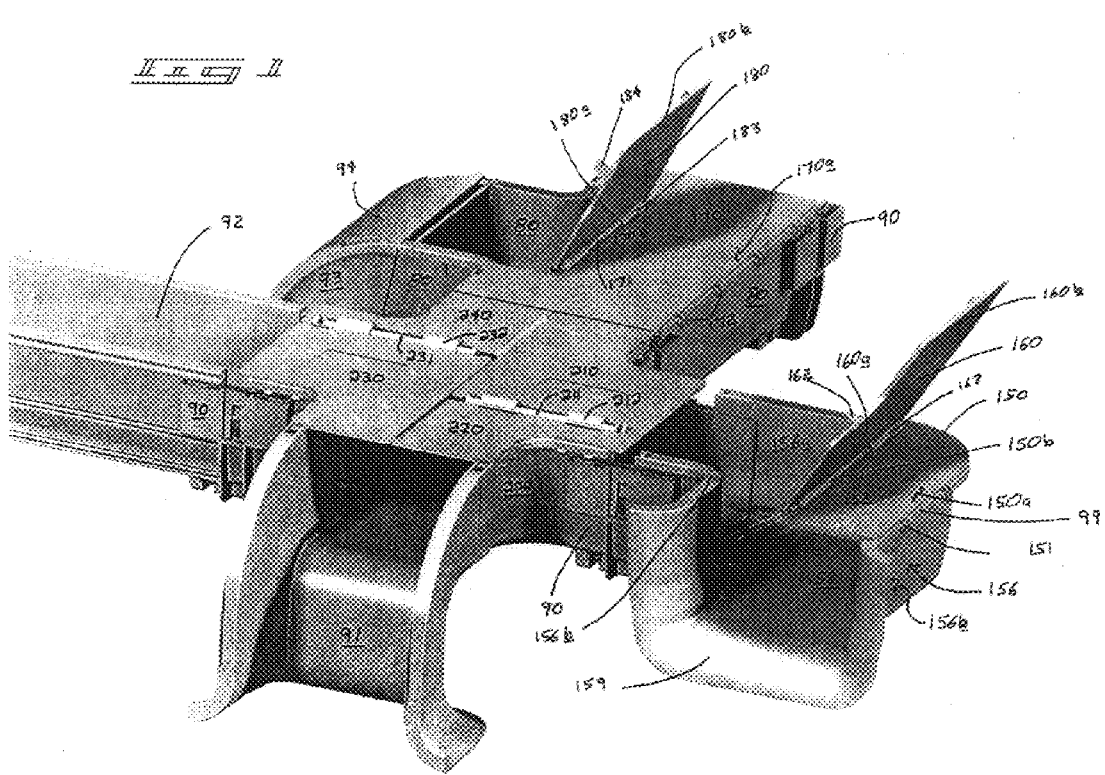

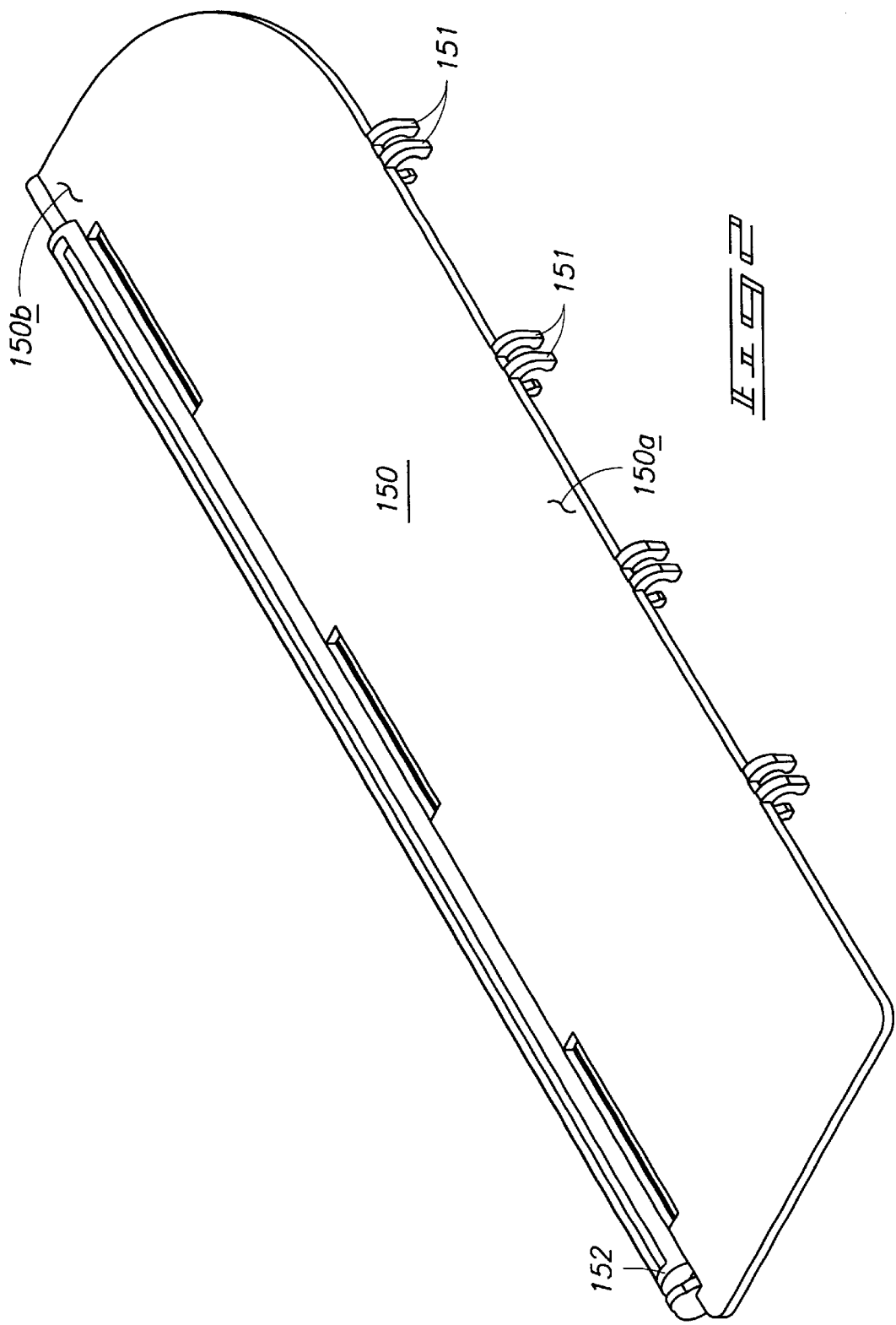

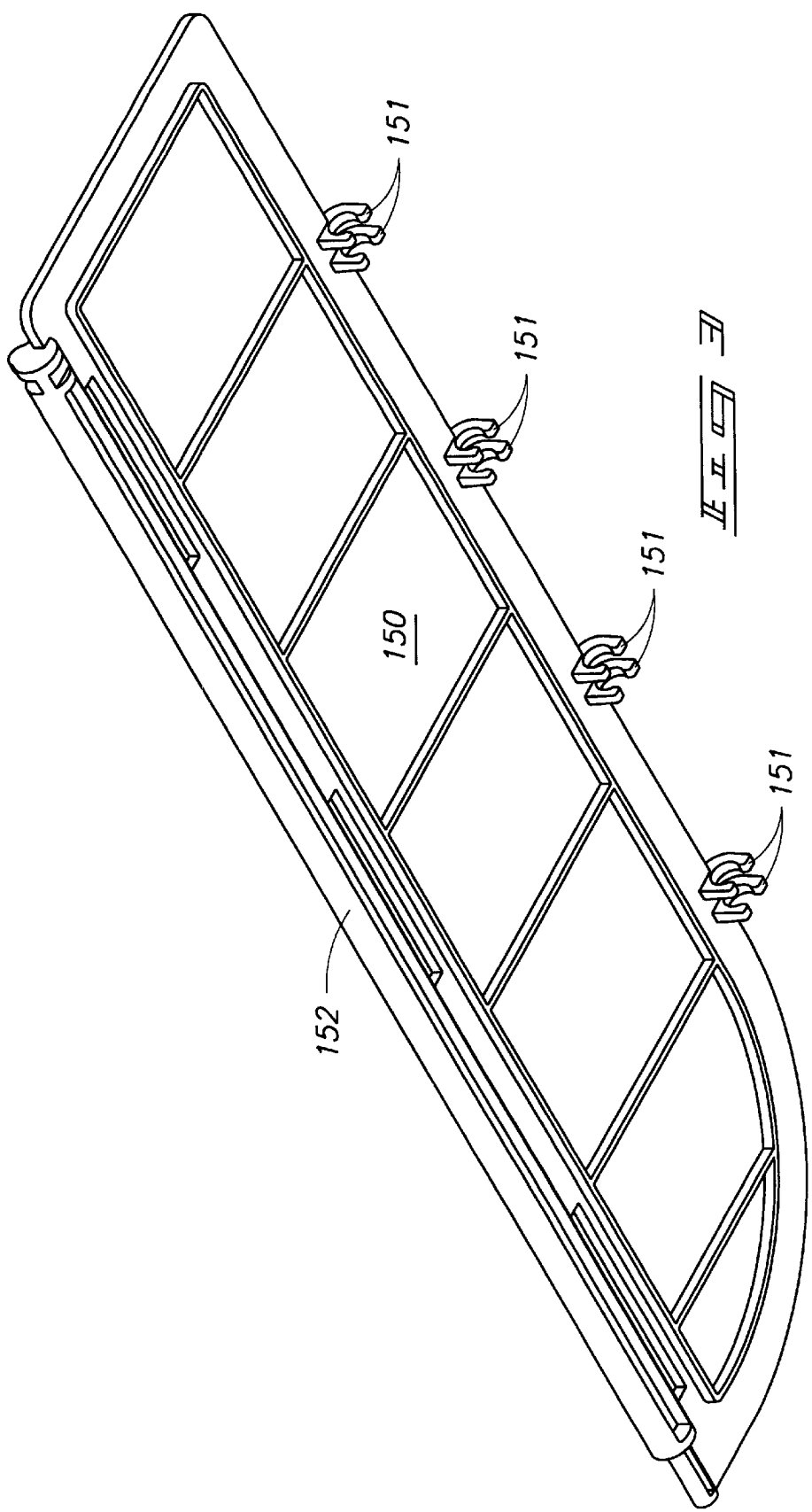

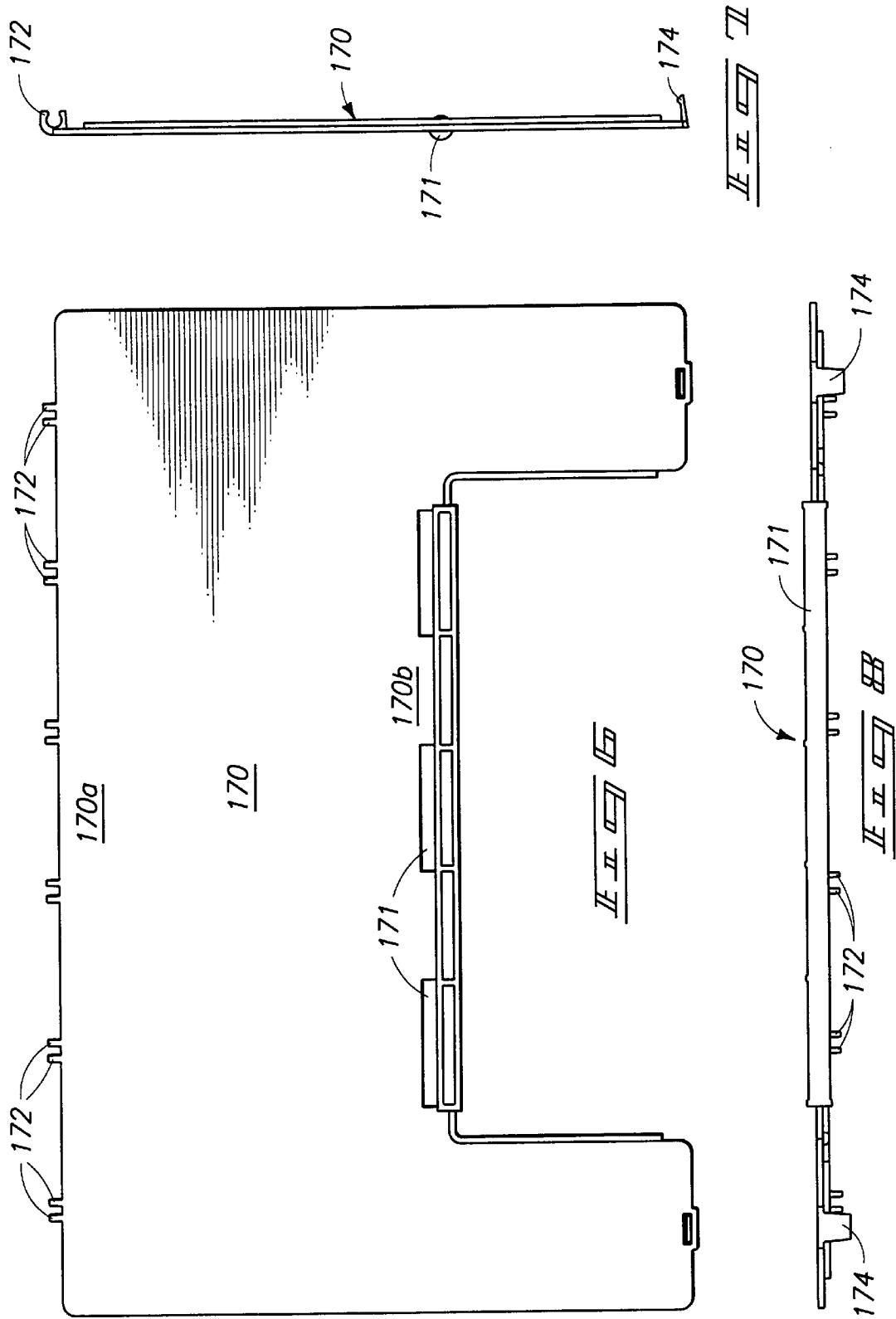

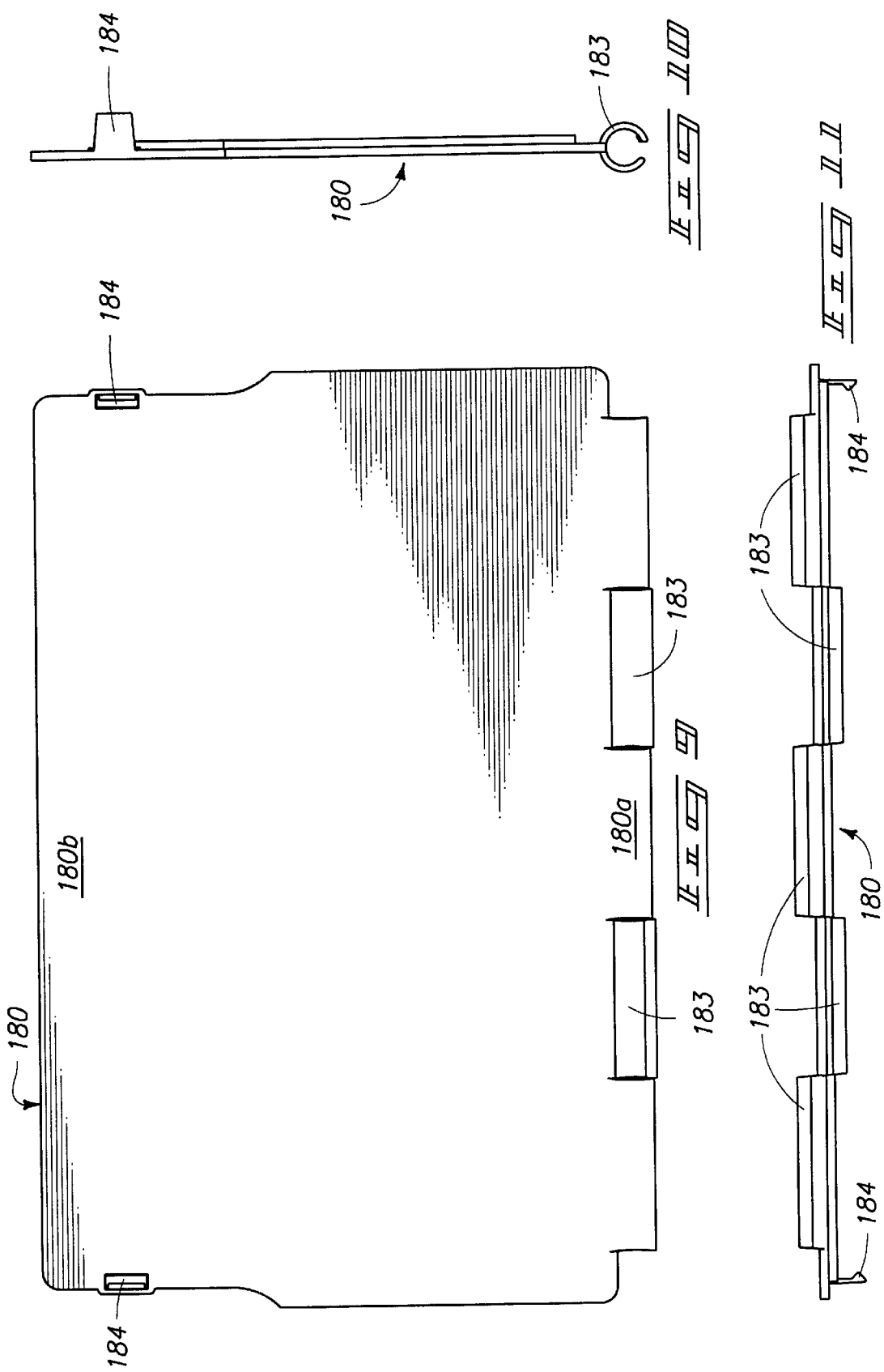

FIBER TROUGH JUNCTION COVER SYSTEM

TECHNICAL FIELD

This invention pertains to a system for the management and routing of fiber optic cables, more particularly to a cover system for covering troughs and junctions while still providing access to the interior of the troughs and junctions, even where there is limited clearance height above the troughs and junctions.

BACKGROUND OF THE INVENTION

In the telecommunications industry there are numerous locations where a significant amount of fiber optic cable must be routed within a facility or from one facility to another. The routing within a facility may be from one piece of equipment to another, or from outside lines coming into a central office and to fiber optic connectors where they are connected to equipment within the facility.

The number of fibers may be great and the fibers must all be handled with great care to avoid damage to the fiber cable, which hinders its performance.

In a typical facility, fiber optic troughs are normally used to carry or route the fiber optic cables. Although not necessarily, in most facilities the troughs are located overhead and over the location of the fiber optic distribution frames, bays and equipment.

In certain types of facilities, a significant trough network is needed to contain and route the fiber cables. The installation time and expense can be substantial for said trough systems. The installation time and expense is further increased when the troughs, trough supports and junctions are not readily adaptable to the configuration desired in the facility and when the troughs, couplings, junctions, downfalls and other equipment do not readily or easily assemble, or when tools such as screwdrivers are required for installation. The typical prior art system requires numerous screws to secure the covers and other components together.

The design, layout and assembly of these trough systems are further complicated because of the unique nature of fiber cables and how the fiber cable must be placed, routed and managed. In the management of fiber optic cables, it is important to maintain a minimum bend radius to protect the fiber optic cables. One typical standard minimum bend radius is one and one-half inches, while another standard minimum bend radius is thirty millimeters (30 mm).

It is also desirable to minimize the number and size of bumps, cracks, holes and other deviations from a smooth surface to which the fibers are exposed, or on which the fibers are supported.

For many years there has been an unsatisfied need to reduce the assembly time and/or expense by providing a trough system which minimizes or eliminates the need for the use of screws and other time consuming fasteners and holders, while still providing a trough system which protects the integrity of the fiber cables.

This invention provides a new trough system which reduces the assembly and installation time and expense of a trough and junction system, and also provides better access in low overhead clearance situations.

In fiber optic trough systems, it is sometimes desirable to provide a cover for the interior of the trough system to prevent dust, parts, tools and other debris from falling into the interior of the fiber trough. It is also typically necessary to have reasonable access to the interior of the trough being covered, especially without having to relocate or move the cover system.

There are currently trough covers which snap on and off and must be taken off and temporarily located or stored elsewhere, while the fibers in the trough are being accessed. It becomes cumbersome to keep installing and removing the snap on type of covers and the covers are consequently removed and not replaced. The removed covers tend to remain piled on the "cover pile" at certain installations and the customer therefore does not get the benefits of having a cover over the trough junctions.

In prior hinged systems, old hinge technology such as metallic hinges, are utilized and the hinged side is normally attached by fasteners (typically screws) to one side of the trough junction, and it spans the entire width or outer dimensions of the trough junction. When the interior of the trough junction must be accessed, the entire cover (which spans the entire width of the trough junction) must be removed or rotated upward if hinges have been installed on one of the outer sides of the junction.

In the numerous installations in which there is very limited access, the hinge function of the cover cannot therefore be utilized in most cases because it doesn't sufficiently open to allow unhindered access due to the limited overhead clearance. Thus, in many applications, these covers likewise end up in the "trough cover pile".

A problem in providing covers for typical trough systems is that the trough systems are typically located overhead and there is very limited vertical distance or space above the trough.

An embodiment of this invention provides a junction cover system for covering a junction element, said junction cover system preferably including two hinges for more desirable access, which allows better access in more limited clearance situations.

Providing a trough cover system is further compounded by the trough junctions because trough junctions typically have a greater span to cover, much greater than the width of the fiber cable troughs. In order to provide reasonable hinged access to junctions in the common limited overhead clearance scenario, a dual and/or split hinged cover is preferably utilized.

BRIEF DESCRIPTION OF THE DRAWINGS

Preferred embodiments of the invention are described below with reference to the accompanying drawings, which are briefly described below.

FIG. 1 is a perspective view of embodiments of the invention contemplated by this invention, including a trough junction cover system for an elbow, a tee and a full or four-way junction;

FIG. 2 is a top perspective view the embodiment of the elbow junction primary cover shown in FIG. 1;

FIG. 3 is a bottom perspective view of the embodiment of the elbow junction primary cover illustrated in FIG. 2;

FIG. 4 is a top perspective view of an embodiment of the elbow junction secondary cover, as also shown in FIG. 1;

FIG. 6 is a top view of an embodiment of a tee junction primary cover as contemplated by this invention, and as shown in FIG. 1;

FIG. 7 is a side view of the embodiment of the tee junction primary cover shown in FIG. 6;

FIG. 8 is an elevation view of the embodiment of the tee junction primary cover shown in FIG. 6;

FIG. 10 is a side view of the embodiment of the tee junction secondary cover shown in FIG. 9;

FIG. 13 is a top perspective view of an embodiment of the primary four way junction cover, as also shown in FIG. 1;

FIG. 14 is a top perspective view of an embodiment of the secondary four way junction cover, as also shown in FIG. 1.

DETAILED DESCRIPTION OF THE PREFERRED EMBODIMENTS

Figure 11:
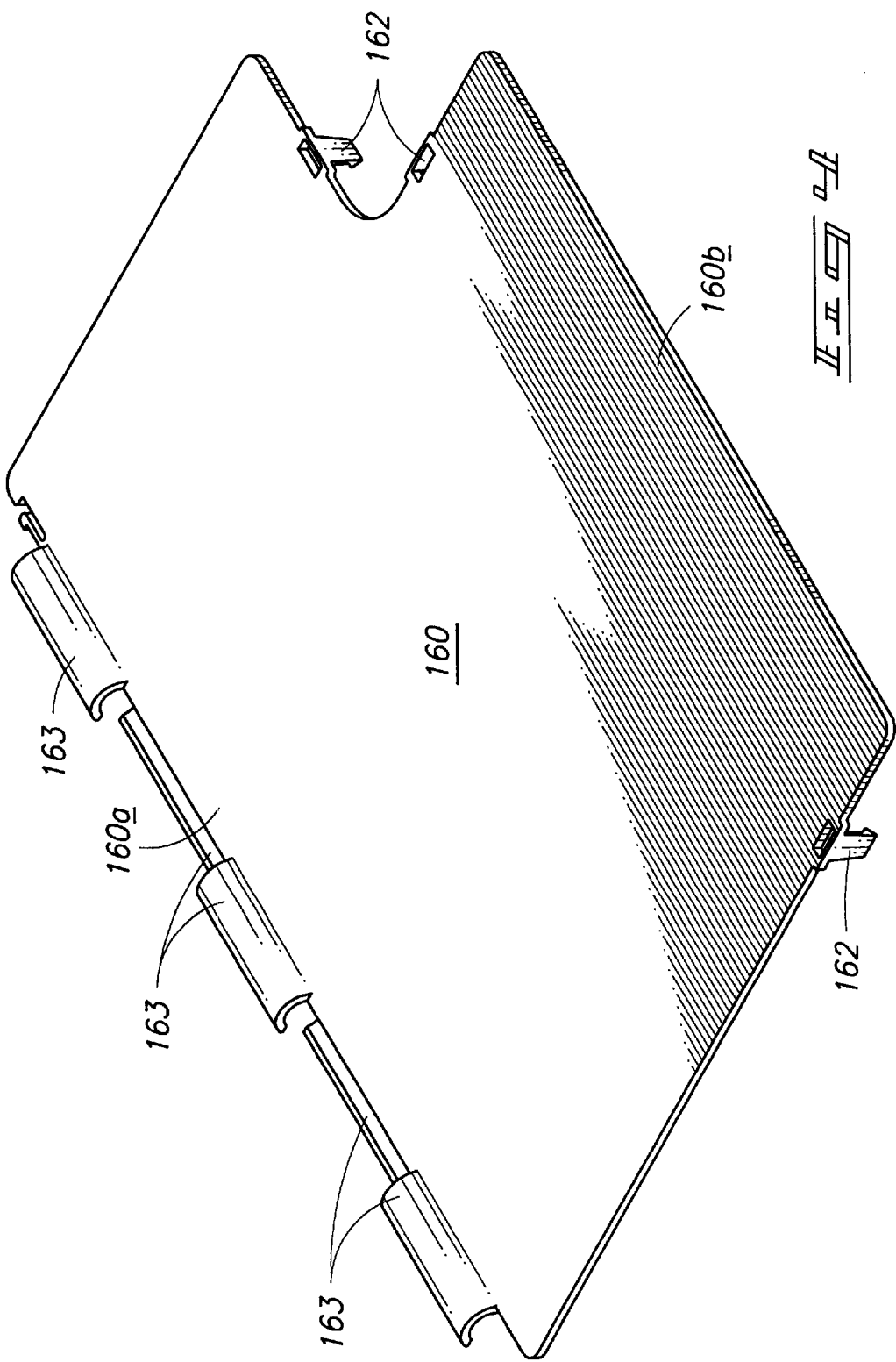
FIG. 11 is an elevation view of the embodiment of the tee junction secondary cover shown in FIG. 9.

Many of the fastening, connection, manufacturing and other means and components utilized in this invention are widely known and used in the field of the invention described, and their exact nature or type is not necessary for an understanding and use of the invention by a person skilled in the art or science; therefore, they will not be discussed in significant detail. Furthermore, the various components shown or described herein for any specific application of this invention can be varied or altered as anticipated by this invention and the practice of a specific application or embodiment of any element may already be widely known or used in the art or by persons skilled in the art or science; therefore, each will not be discussed in significant detail.

The terms "a", "an", and "the" as used in the claims herein are used in conformance with long-standing claim drafting practice and not in a limiting way. Unless specifically set forth herein, the terms "a", "an", and "the" are not limited to one of such elements, but instead mean "at least one".

The term latch is used herein in a broad sense, and covers numerous different mechanisms of attachment/detachment, including each component of a latch such as corresponding and complementary components which interact with one another. The term latch as used herein is in no way to be limited to the configuration(s) shown in the drawings or described herein. The term latch as used herein, by way of example but not limitation, would therefore include structures which fasten or retain, such as a flexible member with a detent or a tab contained thereon, which would then interact with a corresponding and complementary component (also referred to as a latch), which may be a detent or a tab. Latch is intended to cover each of the configurations or structures that attach or fasten to one another in a complementary way, or would for example allow a component to attach to the side wall of the trough. Further the term latch is intended to cover each of the two complementary components which interact or complement each other.

FIG. 1 is a perspective view of embodiments of the invention contemplated by this invention, including a trough junction cover system for an elbow junction 156, a tee junction 80, and an intersection junction 200 (or four-way junction).

The elbow junction 156 has an interior with a bottom wall 158, a first elbow side wall 156a and a second elbow side wall 156b. Elbow junction primary cover 150 is shown pivotally attached to the top 99 of the first side wall 156a of elbow junction 156 via snap clips 151. Elbow junction primary cover 150 has a first end 150a which is pivotally attached to elbow junction 156, and an elbow junction second end 150b which may be pivoted about the elbow junction first end 150a.

Elbow junction secondary cover 160 is shown with a first end 160a, a second end 160b, latches 162, snap clips 163 about pivot rod 152. As can be seen from FIG. 1, elbow junction secondary cover 160 may be opened individually and separate from the opening of elbow junction primary cover 150 to allow easy access to the interior 158 of elbow junction 156. Secondary cover 160 may be pivoted or rotated to a point where it rests on the top of primary cover 150 to free up the operator's hands to deal with the task at hand.

It is also apparent from FIG. 1 that the combination of primary cover 150 and secondary cover 160 may both be pivoted about the first end 150a of primary cover 150, thereby allowing full access to the interior 158 of the elbow junction 156.

FIG. 1 also shows a fiber optic cable junction cover system for a tee junction 80, wherein tee junction primary cover 170 has tee junction primary cover first end 170a, tee junction primary cover second end 170b and a pivot rod 171 at its second end. Tee junction secondary cover 180 likewise has a first end 180a, a second end 180b, latches 184 (flexible members with tabs) and snap clips 183 to pivotally attach to pivot rod 171. Tee junction secondary cover 180 is pivotally attached to primary cover 170 via snap clips 183 on pivot rod 171.

FIG. 1 also illustrates a cover system for a four way intersection junction trough 200, which is a combination of two hinged combinations of primary and secondary covers over the junction for flexible access even in situations with limited overhead clearance. In the first cover, primary cover 210 is pivotally attached to secondary cover 220 via pivot rod 211 and snap clasps 212, which covers part of the junction. In order to complete the covering of the junction while still providing access, a second primary cover 230 is pivotally attached to a second secondary cover 240 via pivot rod 231 and snap clips 232.

FIG. 1 also shows a downspout 91 transition, a trumpet 159 transition, a basis trough 92, couplings 90, downspout 93 with downspout cover 94.

FIG. 2 is a top perspective view the embodiment of the elbow junction primary cover 150, as also shown in FIG. 1. The primary cover 150 has a first end 150a and a second end 150b, with the first end including snap clips 151 which facilitate and provide the pivotable mount to the top of a side wall of the elbow junction.

At the second end 150b of the elbow junction primary cover 150 is a pivot rod 152, to which the secondary cover pivotably mounts to provide the axis of rotation between the primary cover 150 and the secondary cover shown in FIG. 4.

FIG. 3 is a bottom perspective view of the embodiment of the elbow junction primary cover 150 illustrated in FIG. 2, and further illustrates the pivot rod 152 and the snap clips 151.

FIG. 4 is a top perspective view of an embodiment of the elbow junction secondary cover 160, as also shown in FIG. 1. The elbow junction secondary cover 160 has a first end 160a and a second end 160b. The first end 160 has snap clips 163 which facilitate the pivotable mounting or attachment of the first end 160a of the elbow junction secondary cover 160 to the elbow junction primary cover 150 (see FIGS. 2 & 3), as can be seen.

FIG. 4 also shows latches 162, which in this case are flexible tabs which interact with a recessed area on or near the top of a side wall of the junction trough to help secure or fasten the second end 160b of the secondary cover 160 to the elbow junction.

Figure 5:
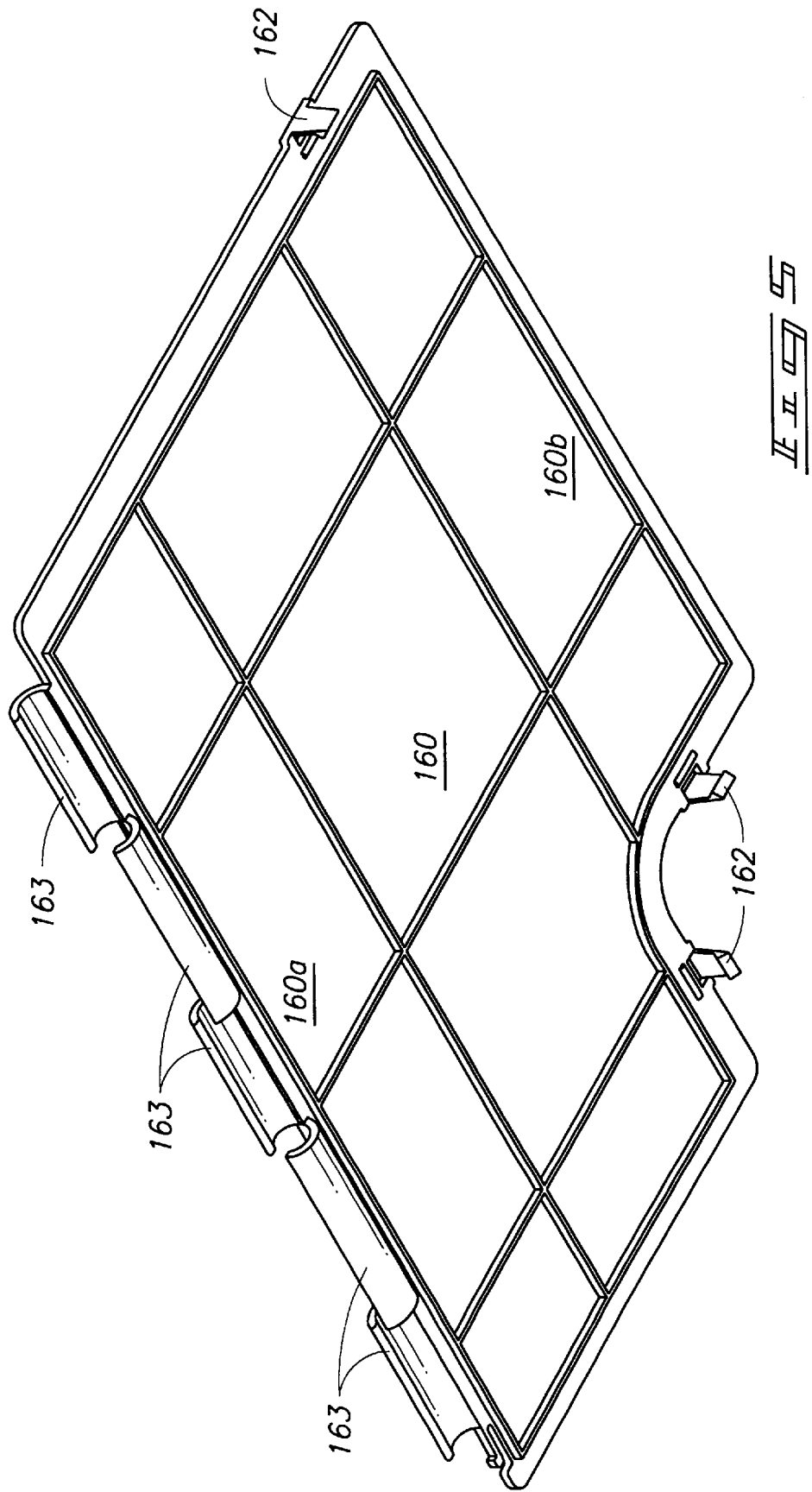
FIG. 5 is a bottom perspective view of an embodiment of the elbow junction secondary cover, as also shown in FIG. 1.

FIG. 5 is a bottom perspective view of an embodiment of the elbow junction secondary cover 160, as shown in FIG. 4, and further illustrates the like numbered items shown in FIG. 4, which will not be repeated here.

FIG. 6 is a top view an embodiment of a tee junction primary cover 170 as contemplated by this invention, and as shown in FIG. 1. FIG. 6 illustrates tee junction primary cover 170 with a first end 170a and a second end 170b. The first end 170a pivotally attaches at or near the top of a side wall of the tee junction via snap clips 172. The second end 170b includes pivot rods 171 to provide the axis of rotation and facilitate the pivotal attachment of the tee junction secondary cover to the primary cover 170.

FIG. 7 is a side view the embodiment of the tee junction primary cover 170 shown in FIG. 6, and shows the snap clips 172 and latches 174. Latches 174 are flexible members with tabs at the end and interact with a detent or tab aperture, which would be complementary latches, on the top of a side wall of the tee junction being covered.

FIG. 8 is an elevation view the embodiment of the tee junction primary cover 170 shown in FIG. 6, and also illustrates snap clips 172, latches 174, pivot rod 171 and snap clips 172.

Figure 9:
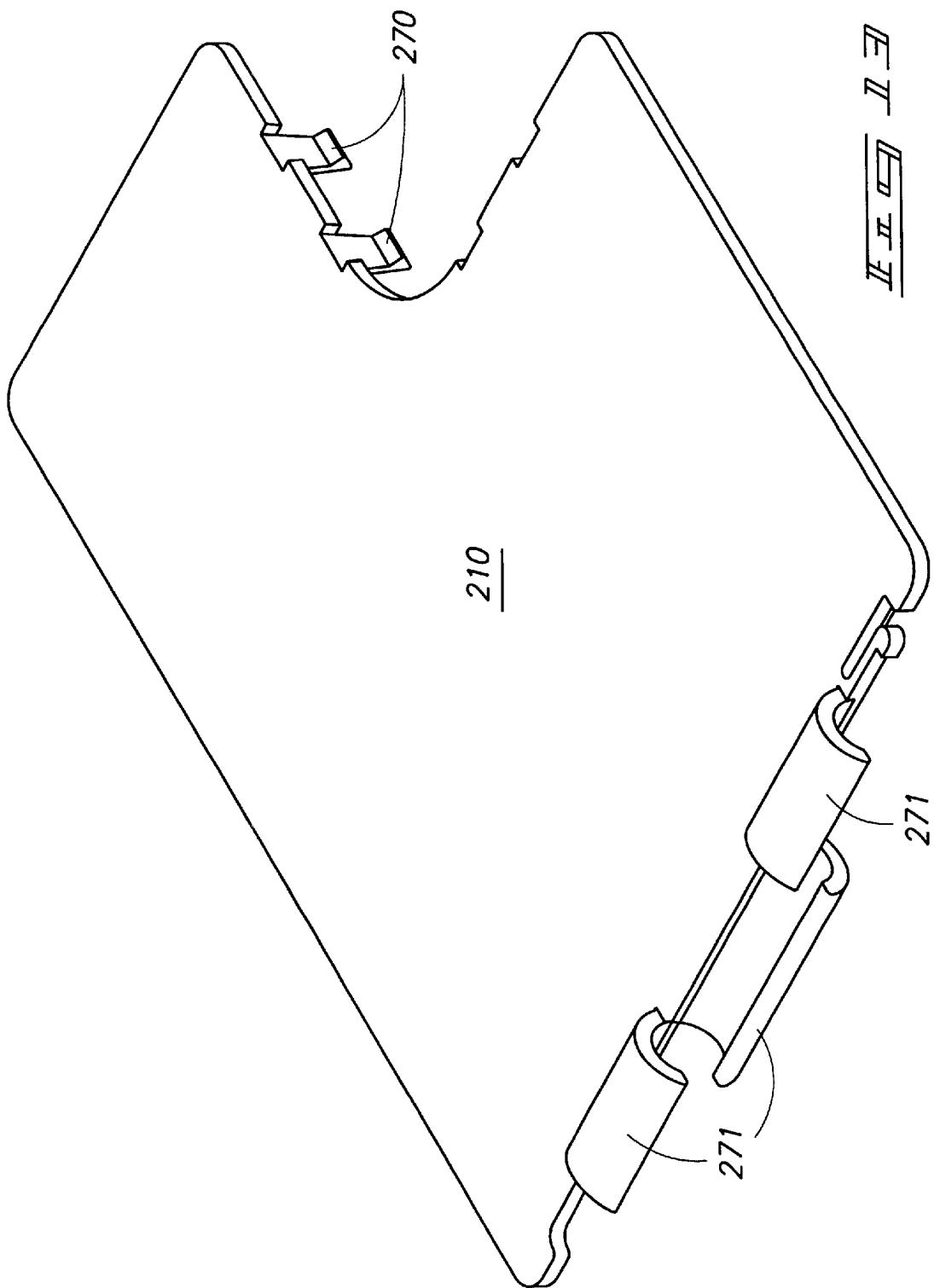
FIG. 9 is a top view of an embodiment of a tee junction secondary cover 180, as also shown in FIG. 1.
Figure 17:
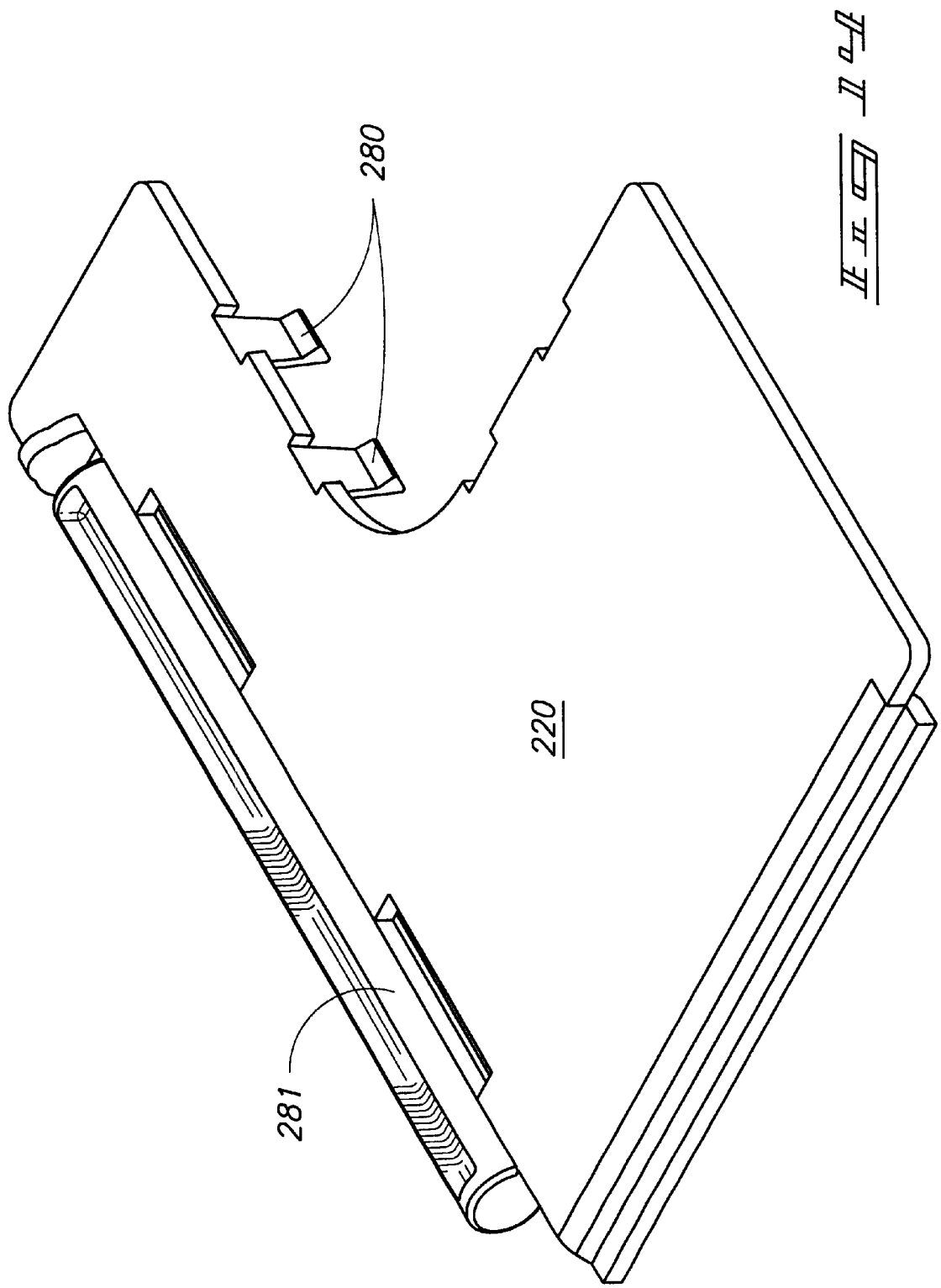

FIG. 9 is a top view of an embodiment of a tee junction secondary cover 180, as also shown in FIG. 1. FIG. 9 illustrates a first end 180a and a second end 180b of the tee junction secondary cover 180, with the first end 180a pivotally attaching the second end 170b (shown in other figures) of the tee junction primary cover 170 (shown in other figures) via snap clips 183. Latches 184 are flexible members with tabs at the end and interact with a detent or tab aperture (which would be complementary latches) on the top of a side wall of the tee junction being covered.

FIG. 10 is a side view of the embodiment of the tee junction secondary cover 180 shown in FIG. 9, and shows latches 184 and snap clips 183.

FIG. 11 is an elevation view of the embodiment of the tee junction secondary cover 180 shown in FIG. 9, and shows snap clips 183, and latches 184.

Figure 12:
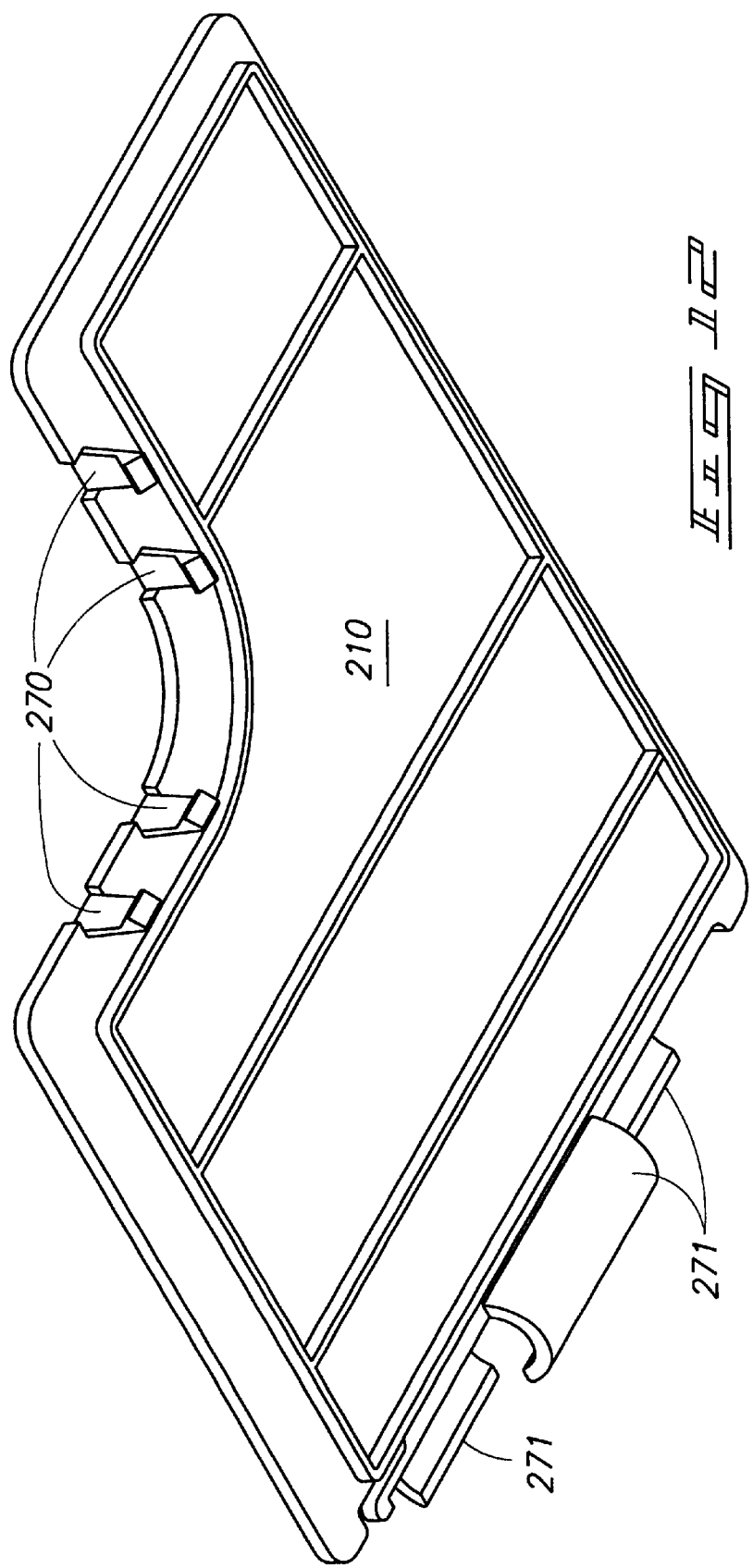
FIG. 12 is a bottom perspective view of an embodiment of the primary four way junction cover, as also shown in FIG. 1.

FIG. 12 is a bottom perspective view of an embodiment of the primary four way junction cover 210, as also shown in FIG. 1, including latches 270 (flexible members with tabs) and snap clips 271.

FIG. 13 is a top perspective view of an embodiment of the primary four way junction cover 210, as also shown in FIG. 1 and in FIG. 12, and illustrates latches 270 (flexible members with tabs) and snap clips 271.

FIG. 14 is a top perspective view of an embodiment of the secondary four way junction cover 220, as also shown in FIG. 1, and illustrates latches 280 (flexible members with tabs) which are complementary to the junction trough, and pivot rod 281.

Figure 15:
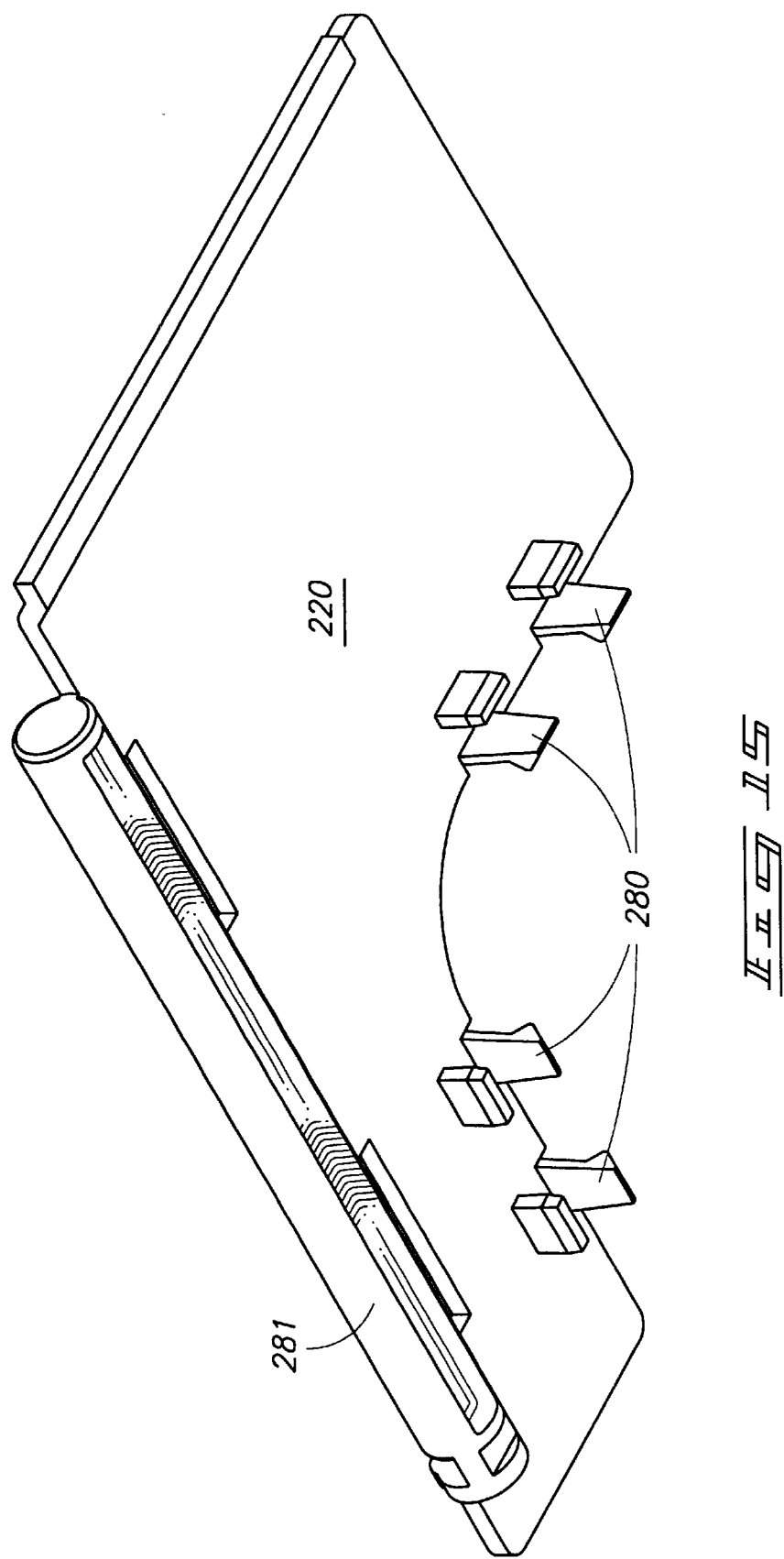
FIG. 15 is a bottom perspective view of an embodiment of the secondary four way junction cover, as also shown in FIG. 1.

FIG. 15 is a bottom perspective view of an embodiment of the secondary four way junction cover 220, as also shown in FIG. 1, and illustrates latches 280 (flexible members with tabs) which are complementary to the junction trough, and pivot rod 281.

The combination of covers for the intersection junction allows the two primary covers to be pivoted upward thereby providing access to all four legs of the intersection without having to reposition a cover.

As will be appreciated by those of reasonable skill in the art, there are numerous embodiments to this invention, and variations of elements and components which may be used, all within the scope of this invention. Embodiments of this invention will be in a trough junction cover and in a trough system which includes such a cover.

One embodiment of this invention for example for the fiber optic cable junction trough cover is comprised of: a junction primary cover with a first end and a second end, the first end being adapted to be pivotally mounted to a trough junction; a junction secondary cover pivotally mounted to the primary cover; such that the primary cover combined with the secondary cover, generally cover the top of the junction. This same basic cover in combination with a fiber optic cable trough junction would be another example of an embodiment of the invention.

Another example of a fiber optic cable junction trough cover is one which is adapted to cover the top of a fiber optic cable trough junction, the trough cover being comprised of: a junction primary cover with a first end and a second end, the first end being adapted to be pivotally mounted to a trough junction; a junction secondary cover with a first end and a second end, the first end being pivotally mounted to the primary cover and forming an axis of rotation of the secondary cover about the primary cover, such that the primary cover combined with the secondary cover, generally cover the top of the junction; wherein the axis of rotation of the secondary cover is disposed intermediately between outer boundaries of the junction; and further wherein the distance between the first end and the second end of the secondary cover is less than the distance between the outer boundaries of the junction.

Up until this invention, hinges if any have been along the side or outer boundaries of the junction. What this does is require a greater span of rotation to access the interior of the junction, or the complete removal of the junction cover.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

We claim:

1. A fiber optic cable junction trough cover adapted to cover the top of a generally horizontal fiber optic cable trough junction, the trough cover comprised of:
 a. a junction primary cover with a first end and a second end, the first end being adapted to be pivotally mounted to a generally horizontal trough junction;
 b. a junction secondary cover pivotally mounted to the primary cover; such that the primary cover combined with the secondary cover, generally cover the top of the junction, wherein pivoting the secondary cover provides a partial access to the junction.

2. A covered fiber optic cable junction trough system comprising:
 a. a generally horizontal fiber optic cable trough junction with a bottom wall, and a plurality of side walls, each side wall having a top;

b. a trough cover adapted to cover the top of the trough junction, the trough cover comprised of:
  i. a junction primary cover with a first end and a second end, the first end being pivotally mounted to the trough junction;
  ii. a junction secondary cover pivotally mounted to the primary cover;

such that the primary cover combined with the secondary cover generally covers the top of the junction, wherein pivoting the secondary cover provides a partial access to the junction.

3. A fiber optic cable junction trough cover adapted to cover the top of a generally horizontal fiber optic cable trough junction, the trough cover comprised of:
  a. a junction primary cover with a first end and a second end, the first end being adapted to be pivotally mounted to a generally horizontal trough junction;
  b. a junction secondary cover with a first end and a second end, the first end being pivotally mounted to the primary cover and forming an axis of rotation of the secondary cover about the primary cover, such that the primary cover combined with the secondary cover, generally cover the top of the junction;

wherein the axis of rotation of the secondary cover is disposed intermediately between outer boundaries of the junction; and further wherein the distance between the first end and the second end of the secondary cover is less than the distance between the outer boundaries of the junction, and further wherein pivoting the secondary cover provides a partial access to the junction.

* * * * *